United States Patent
Urushibara

(10) Patent No.: US 8,099,747 B2
(45) Date of Patent: Jan. 17, 2012

(54) DISK CHUCKING DEVICE FOR HOLDING A DISK

(75) Inventor: Fumio Urushibara, Tokyo (JP)

(73) Assignee: Showa Denko K.K., Tokyo (JP)

( * ) Notice: Subject to any disclaimer, the term of this patent is extended or adjusted under 35 U.S.C. 154(b) by 286 days.

(21) Appl. No.: 12/501,064

(22) Filed: Jul. 10, 2009

(65) Prior Publication Data

US 2010/0043018 A1 Feb. 18, 2010

(30) Foreign Application Priority Data

Jul. 15, 2008 (JP) ................ P2008-184210

(51) Int. Cl.
*G11B 17/028* (2006.01)
(52) U.S. Cl. .................... 720/708; 720/714
(58) Field of Classification Search .......... 720/703, 720/706, 707, 708, 714
See application file for complete search history.

(56) References Cited

U.S. PATENT DOCUMENTS

| | | | | |
|---|---|---|---|---|
| 5,555,233 | A * | 9/1996 | Yano et al. | 720/709 |
| 5,956,315 | A * | 9/1999 | Sawai et al. | 720/708 |
| 6,041,033 | A * | 3/2000 | Otsubo et al. | 720/707 |
| 6,363,048 | B1 * | 3/2002 | Wu et al. | 720/707 |
| 6,868,549 | B2 * | 3/2005 | Watanabe et al. | 720/715 |
| 7,051,346 | B2 * | 5/2006 | Masaki et al. | 720/706 |
| 7,216,356 | B2 * | 5/2007 | Lee | 720/708 |
| 7,313,801 | B2 * | 12/2007 | Choi et al. | 720/709 |
| 2005/0108743 | A1 * | 5/2005 | Kawamura | 720/708 |

FOREIGN PATENT DOCUMENTS

| | | |
|---|---|---|
| JP | 63-195676 U | 12/1988 |
| JP | 2-11537 U | 1/1990 |
| JP | 06-314456 A | 11/1994 |
| JP | 2007-102959 A | 4/2007 |

OTHER PUBLICATIONS

Japanese Office Action issued in Japanese Patent Application No. 2008-184210 mailed Dec. 6, 2011.

* cited by examiner

*Primary Examiner* — Brian Miller
(74) *Attorney, Agent, or Firm* — Sughrue Mion, PLLC

(57) ABSTRACT

A disk chucking device includes a guide shaft for insertion into the central hole of a disk. A supporting member at the base side of the guide shaft supports a vicinity of the central hole at one surface of the disk. A cylindrical holding member approaches to or separates from the supporting member. A plunger moves along the holding member. A ball supporting member in the plunger stores a ball. An elastic member is locked by the plunger and the holding member, and biases to separate the plunger and the holding member in the axial direction of the guide shaft. A locking portion of the guide shaft prevents plunger movement in the axial direction of the guide shaft by making contact with the balls. An inside protrusion of the holding member supports the balls by surrounding together with the guide shaft when the balls are contacted with the locking portion.

6 Claims, 5 Drawing Sheets

DISK CHUCKING DEVICE FOR HOLDING A DISK

CROSS-REFERENCE TO RELATED APPLICATION

Priority is claimed on Japanese Patent Application, No. 2008-184210, filed on Jul. 15, 2008, the contents of which are incorporated herein by reference in their entirety.

BACKGROUND OF THE INVENTION

1. Field of the Invention

The present invention relates to a disk chucking device for holding a magnetic disk or an optical disk, which has a doughnut shape and a central hole, to a disk drive device in inspection devices or disk holding devices.

2. Description of the Related Art

The above-mentioned disk is automatically loaded to or removed from the disk drive device in the inspection devices using a disk mounting device, i.e., a robot hand. The disk drive device is provided with a disk chucking device for holding detachably the disk to a rotational position.

In addition, the disk is held in the disc chucking device in a film forming step, a cleaning step, an etching step, etc. during a disk production process.

As shown in Patent Document No. 1, conventional disk chucking devices have used a C-shaped chucking ring as a means for holding a disk by being fit into the central hole of the disk.

The C-shaped chucking ring wraps a C-shaped spring. The disk can be held by spreading the C-shaped chucking ring against the biasing force of the C-shaped spring, and contacting the C-shaped chucking ring to the inside of the central hole of the disk with pressure. The disk can be released by closing the C-shaped ring using the biasing force of the C-shaped spring, and releasing the contact between the C-shaped chucking ring and the central hole of the disk.

In addition, the disk chucking device of Patent Document No. 1 also has a circumferential cam which goes up and down along the central axis of the central hole of the disk to spread and close the C-shaped ring. Furthermore, the disk chucking device uses an air chucking system which makes the circumferential cam go up to release the hold of the disk by the C-shaped chucking ring and makes the circumferential cam go down to hold the disk by the C-shaped chucking ring.

More specifically, the disk chucking device of Patent Document No. 1 uses a structure in which the circumferential cam is provided to a top end of a shaft, and the circumferential cam is always biased downwardly by a spring having a downward biasing force.

When an air force (positive pressure) is applied to a lower surface of a diaphragm provided in the bottom end of the shaft, the shaft and the circumferential cam go up along their axis while resisting the downward biasing force of the spring. While going up, the C-shaped chucking ring is released from the inner surface of the central hole in the disk, and closes to release the disk.

In contrast, when the air force applied to the lower surface of the diaphragm is removed, the shaft and the circumferential cam go down along their axis by the downward biasing force of the spring. While going down, the C-shaped chucking ring spreads due to its resilience, and thereby the C-shaped chucking ring presses to and holds the inner surface of the central hole in the disk.

Patent Document No. 2 discloses a disk chucking device having plural chucking clicks in which the chucking clicks are inserted inside of the central hole in the disk, and the gaps between the chucking clicks are spread to hold the disk from the inside of the central hole.

[Patent Document No. 1] Japanese Unexamined Patent Application, First Publication No. H06-314456

[Patent Document No. 2] Japanese Unexamined Patent Application, First Publication No. 2007-102959

In the disk chucking device using the air chucking system, since an air actuation mechanism for operating the C-shaped chucking ring and the circumferential cam have to be stored in the disk driving device, the disk drive device is larger, and complicated. In addition, a spindle motor, which is a driving force for the disk drive device and forms a joint of the air flow, is large and extremely expensive.

In addition, it is difficult for the C-shaped chucking ring and the C-shaped spring to be elastically displaced with a uniform curvature factor in the whole circumference because they are C-shaped. Furthermore, a difference between elastic displacement amounts in the C-shaped chucking ring and the C-shaped spring is easily generated. Therefore, it is difficult to uniformly contact the C-shaped chucking ring to the inner surface of the central hole in the disk with pressure. As a result, it is also difficult to rotate stably the disk at high speed. Furthermore, when the inner surface of the central hole in the disk is pressed non-uniformly, it causes strain or deformation of the disk, and degrades the reliability of inspections.

When the C-shaped chucking ring spreads, cutout portions of the C-shaped spring may scratch the surface of the C-shaped chucking ring. In addition, the cutout portions of the C-shaped spring slide on the surface of the C-shaped chucking ring, and generate dusts have make adverse effects on the inspection of disks. Furthermore, when dusts are generated during a production process of a disk, the dusts may be contaminated in a film formed on the surface of the disk, and may degrade the film properties.

In addition, when the holding force is increased to hold the disk during rotation at high speed in the disk chucking device, in which a disk is held by inserting the chucking clicks through the central hole of the disk and spreading the gap between the chucking clicks, the chucking clicks may scratch the inner surface of the central hole in the disk.

SUMMARY OF THE INVENTION

In consideration of the above-described problems, it is an object of the present invention to provide a disk chucking device, which does not use the C-shaped chucking ring and the air chucking systems which have been used in conventional disk chucking devices, and does not scratch the inner surface of the central hole in the disk.

That is, one object of the present invention is to provide a disk chucking device which can solve dramatically the above-mentioned problems in the disk chucking device using the C-shaped chucking ring and the air chucking systems, by the disk chucking device holding the disk from the inside surface of the central hole in the disk.

In order to achieve the object, the present invention provides the following:

(1) A disk chucking device which holds a disk having a central hole by sandwiching a vicinity of the central hole of the disk from one surface and another surface vertically in a thickness direction of the disk,
   wherein the disk chucking device includes:
   a guide shaft which is inserted into the central hole of the disk;

a supporting member which is arranged at the base side of the guide shaft, and supports a vicinity of the central hole at the one surface of the disk;

a cylindrical holding member which is arranged so as to approach to or separate from the supporting member in an axial direction of the guide shaft;

a plunger which is arranged so as to move along the holding member in the axial direction of the guide shaft;

a ball supporting member which is formed in the plunger at the base side of the guide shaft;

a ball which is stored in the ball supporting member and supported slidably in the axial direction of the guide shaft together with the plunger;

an elastic member which is locked by the plunger and the holding member, and biases to separate the plunger and the holding member in the axial direction of the guide shaft, and biases to the holding member toward the vicinity of the central hole at the another surface of the disk;

a locking portion, which prevents the movement of the plunger in the axial direction of the guide shaft by making contact with the balls, formed at the outside of the guide shaft, and a protrusion, which supports the balls by surrounding together with the guide shaft when the balls are contacted with the locking portion, formed at the inside of the holding member.

(2) The above-mentioned disk chucking device, wherein the guide shaft has a small diameter portion and a large diameter portion, the large diameter portion is the locking portion, the ball moves along the small diameter portion in the axial direction of the guide shaft, the plunger moves along the holding member, the movement of the plunger is prevented by making the balls contact with the large diameter portion, and the elastic member presses the holding member toward the disk by its elastic force while the balls are supported by being surrounded by the guide shaft and the protrusion.

(3) The above-mentioned disk chucking device, wherein the plunger is pressed toward the base portion of the guide shaft along the holding member to release the ball, which is locked between the locking portion and the protrusion, to enable the balls to move in the diameter direction of the guide shaft, and to enable the holding member and the plunger release from the guide shaft, thereby, releasing the disk.

(4) The above-mentioned disk chucking device, wherein the disk chucking device further includes a pressing rod which presses the plunger toward the base side of the guide shaft to release the holding of the disk by the holding member, and a locking click which holds the holding member when the pressing rod releases the holding of the disk; and while releasing the disk, the plunger, the holding member, the pressing rod, and the locking click are separated from the guide shaft and the disk.

(5) The above-mentioned disk chucking device, wherein the disk chucking device has plural ball supporting members formed around the guide shaft; the ball is stored in the ball supporting members to arrange plural balls around the guide shaft; and the protrusion which is formed in the holding member holds the plural balls between the protrusion and the guide shaft while the plural balls are contacted with the locking portion of the guide shaft.

(6) The above-mentioned disk chucking device, wherein the chucking device further includes a motor; the guide shaft is provided at the end of an output shaft of the motor; the supporting member is provided at a side in which the output shaft of the motor is provided; the holding member and the plunger member are provided around the guide shaft, and the disk can be rotated by the motor while being supported by the supporting member and the holding member.

In the disk chucking device according to the present invention, the vicinity of the central hole of the disk is sandwiched from both sides in the thickness direction of the disk, that is, one surface side and another surface side of the disk, using the supporting member and the holding member. Therefore, the disk is reliably held without the vicinity of the central hole of the disk becoming damaged. Due to this, even when the disk is rotated at high speed while being held, the disk may not be damaged.

In addition, the disk chucking device according to the present invention does not use the C-shaped chucking ring and the air chucking system. Therefore, the vicinity of the central hole of the disk is not pressed non-uniformly. Due to this, there is no possibility of strain or deformation being caused in the disk. When the disk is inspected using the disk chucking device according to the present invention, the reliability of the inspection is not decreased.

Furthermore, since the disk chucking device according to the present invention does not use the C-shaped chucking ring, there is no problem of dusts, which are harmful for the disk inspection, being generated by sliding the C-shaped chucking ring on the disk.

In the disk chucking device according to the present invention, the supporting member and the holding member, which sandwich the vicinity of the central hole of the disk, are operated using the elastic force of the elastic member. In addition, the ball moves corresponding to the movement of the plunger, and the disk is held by holding the ball between the guide shaft and the protrusion of the holding member. Therefore, the operation is carried out reliably. In particular, when the elastic force of the elastic member is adjusted, a holding force, which can hold the disk reliably, can be obtained.

When the plunger is pressed so as to go down in the holding member, the ball, which is locked between the guide shaft and the protrusion of the holding member, is released, and the disk can be released. Therefore, according to the disk chucking device of the present invention, release of the disk can be carried out reliably with ease.

Furthermore, when the pressing rod for pressing the plunger and the locking click for locking the holding member while the plunger is pressed by the pressing rod are provided with the disk chucking device according to the present invention, it is possible to release the disk by operating them. Thereby, release of the disk can be carried out automatically with ease. Due to this, it is possible to transport the disk using a transporting device, such as a robot. It is also possible to hold, release, and transport the disk automatically.

In addition, when the disk chucking device according to the present invention is provided with the output shaft of the motor, it is possible to rotate the disk at high speed while holding the disk. Even when the disk is rotated at high speed, it is possible to hold the disk reliably without damage.

BRIEF DESCRIPTION OF THE DRAWINGS

FIG. 7 is a partially cross-sectional view showing one embodiment of the plunger used in the disk chucking device according to the present invention.

DETAILED DESCRIPTION OF THE INVENTION

One embodiment of the disk chucking device according to the present invention will be explained in detail referring to Figures. However, the disk chucking device according to the present invention is not limited to the following embodiment.

Figure 1:
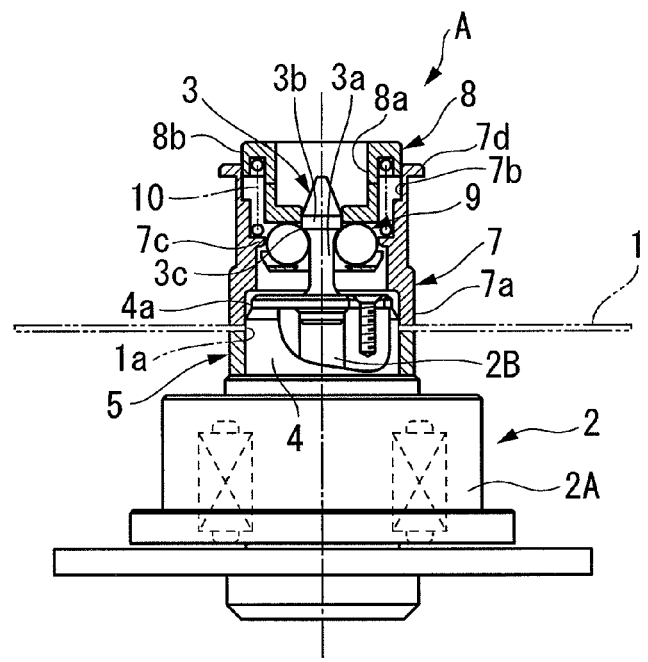
FIG. 1 is a cross-sectional view showing one embodiment of the disk chucking device according to the present invention when clamping the disk.
Figure 2:
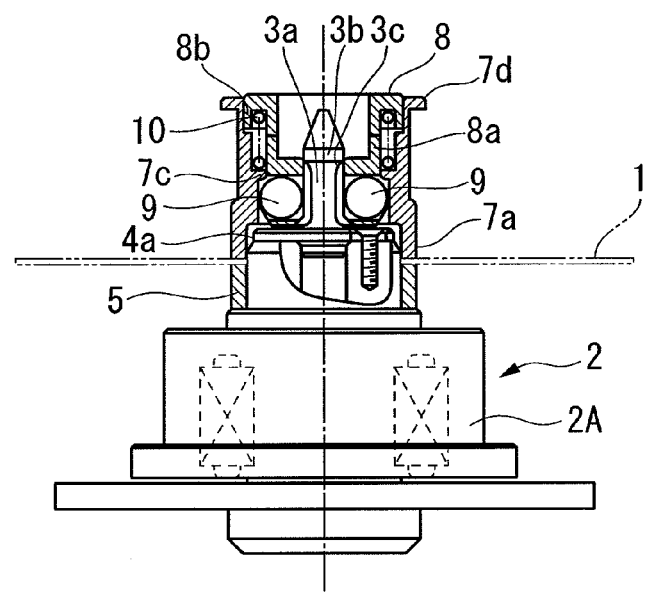
FIG. 2 is a cross-sectional view showing one embodiment of the disk chucking device according to the present invention when releasing the disk.
Figure 3:
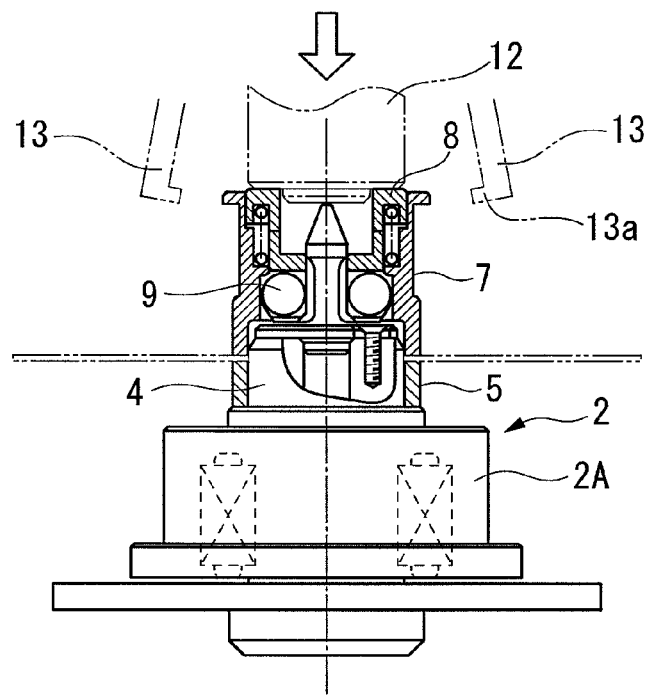
FIG. 3 is a partially cross-sectional view showing the positional relationship between the locking clicks and the disk chucking device according to the present invention when releasing the disk by a pressing rod.
Figure 4:
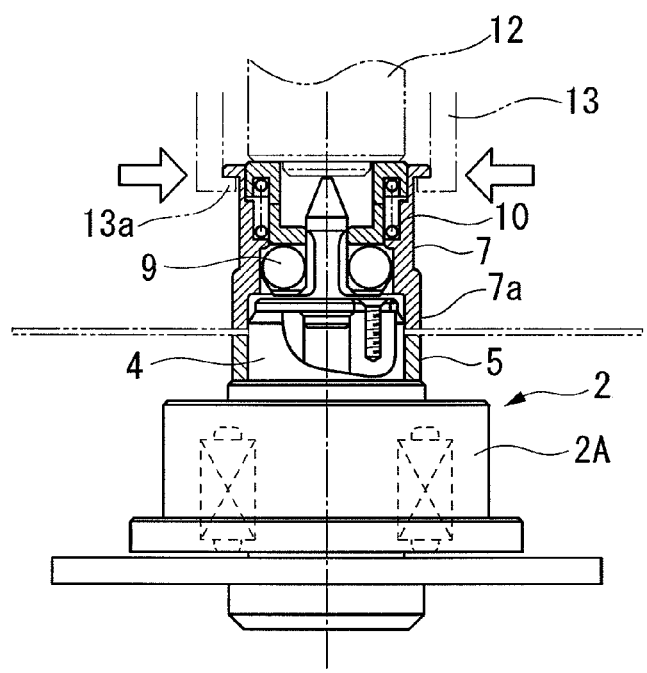
FIG. 4 is a partially cross-sectional view showing the disk chucking device according to the present invention when releasing the disk by a pressing rod, and holding a part of the disk chucking device by the locking clicks.
Figure 5:
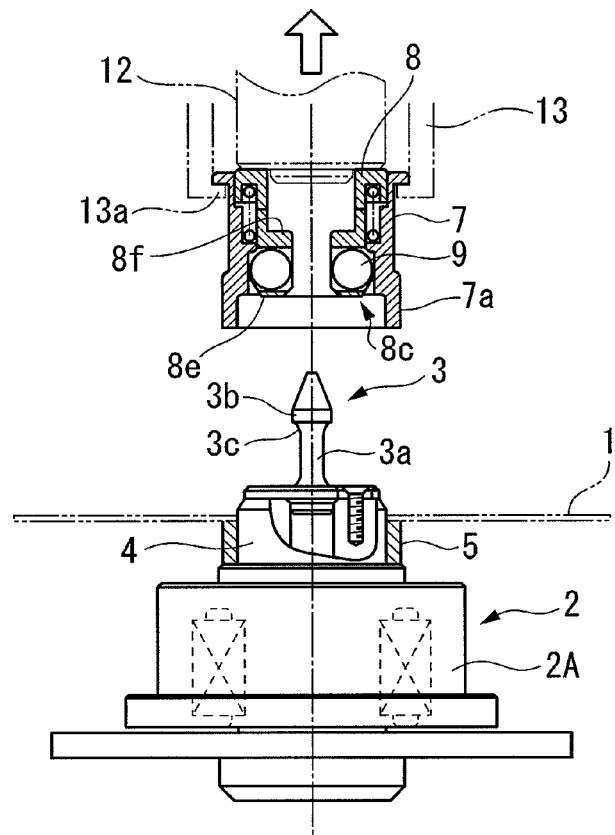
FIG. 5 is a partially cross-sectional view showing the disk chucking device according to the present invention when releasing the disk and separating the plunger and the holding member from the guide shaft.
Figure 6:
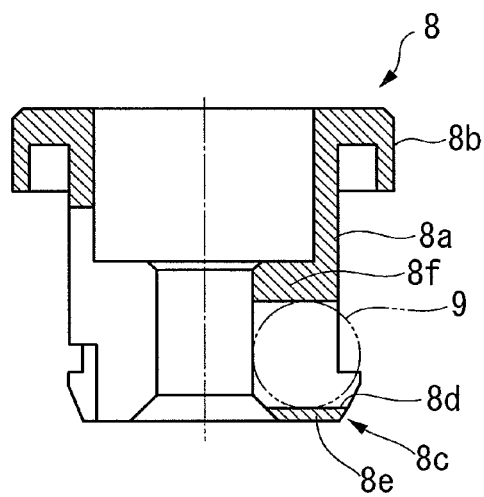
FIG. 6 is a partially cross-sectional view showing one embodiment of the plunger used in the disk chucking device according to the present invention.
Figure 7A:
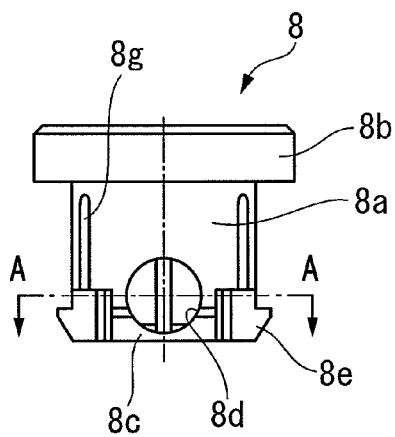
FIG. 7A is a front view showing the plunger.
Figure 7B:
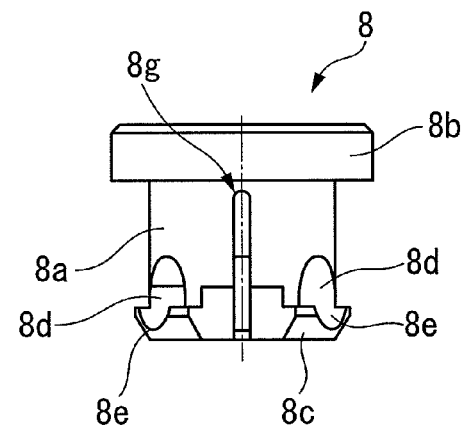
FIG. 7B is a side view showing the plunger.
Figure 7C:
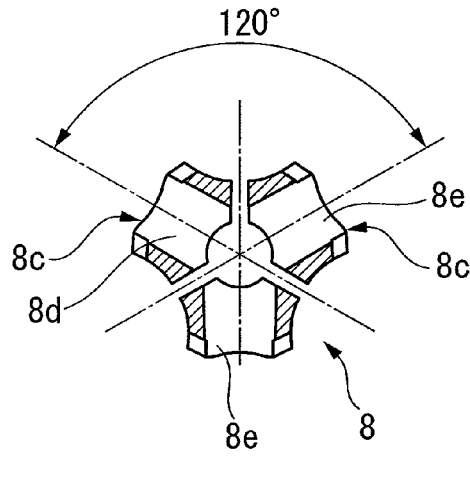
FIG. 7C is a cross-sectional view along line A-A in FIG. 7A.
Figure 7D:
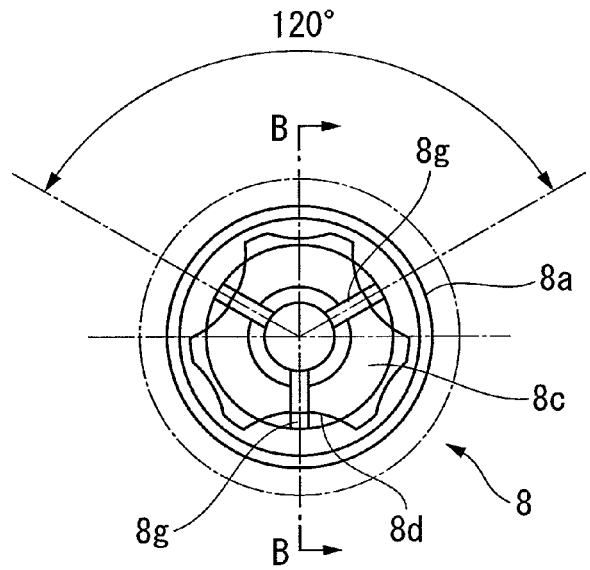
FIG. 7D is a view showing the bottom of the plunger.
Figure 8:
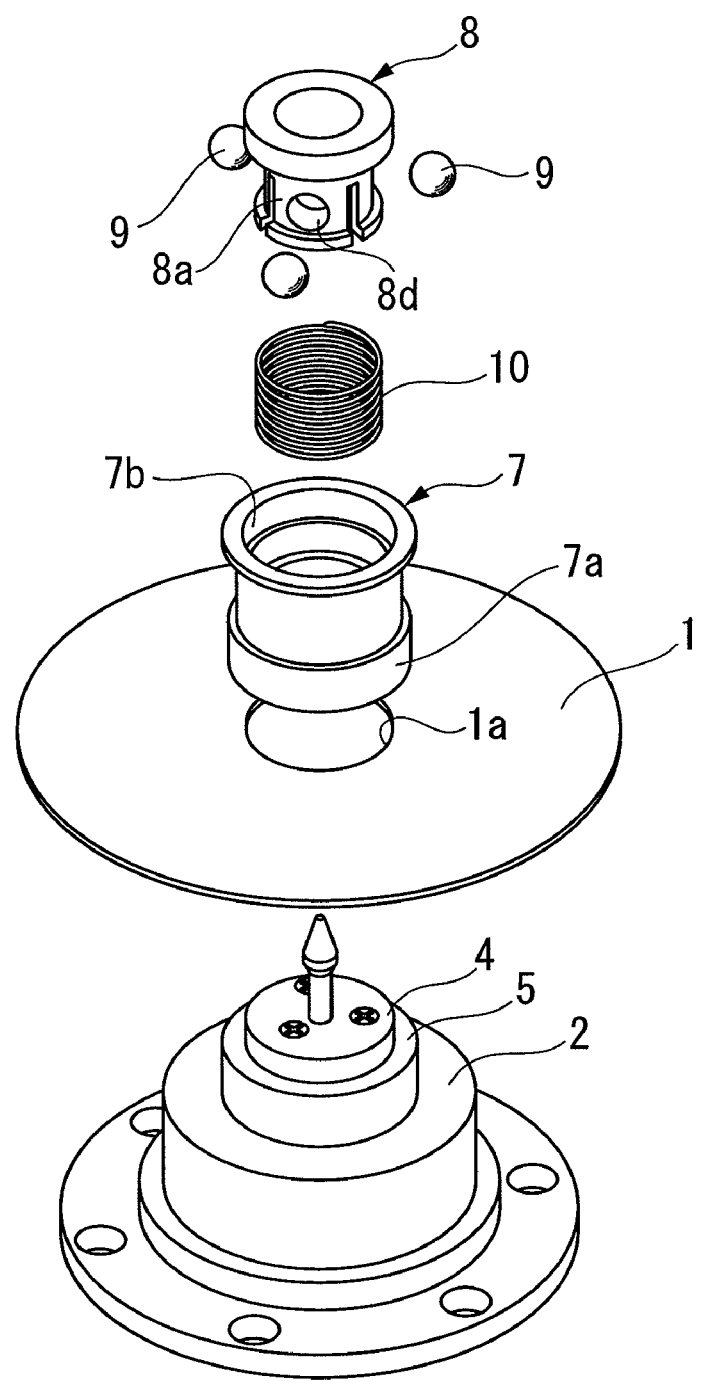
FIG. 8 is an exploded perspective view showing the disk chucking device according to the present invention.

FIG. 1 is a partially cross-sectional view showing the disk chucking device A of the embodiment which holds a disk 1 having a doughnut shape, such as a magnetic disk, an optical disk. FIG. 2 is a partially cross-sectional view showing the disk chucking device A which releases the disk 1. FIGS. 3 to 5 are partially cross-sectional views explaining operations of the disk chucking device A when releasing the disk 1. FIGS. 6 to 8 are views showing the components of the disk chucking device A.

The disk chucking device A in this embodiment is combined at the end side of an output shaft 2B of a motor 2. The motor 2 has a cylindrical case 2 for covering inner components such as a rotor, a stator, and a coil. The output shaft 2B is formed so as to protrude at the center part of the end of the case 2. A guide shaft 3 is formed so as to extend from the output shaft 2B.

Moreover, inner components in the motor 2 are omitted in Figures. However, as explained above, the motor 2 includes components, such as a rotor, a stator, and a coil, and rotates the output shaft 2B.

The motor 2 has a cylindrical mounting member 4, which covers the output shaft 2B, on the end of the case 2 at which the output shaft 2B is mounted. A ring-shaped supporting member 5 is provided at the outer side of the mounting member 4 such that the output shaft 2B is positioned at the center portion of the supporting member 5. In addition, a guide shaft 3 protrudes from the center part of the top surface of the mounting member 4.

The mounting member 4 has a tapered portion 4a, which has a diameter smaller than that of the side wall thereof, on the top surface side at which the guide shaft 3 is formed (outer top surface of the mounting member 4). The outer diameter of the mounting member 4 has a size such that the mounting member 4 can pass through the central hole 1a of the disk 1 to be held. The outer diameter of the supporting member 5 has a size such that the supporting member 5 makes contact with the vicinity of the central hole 1a of the disk 1. Due to these sizes, the disk 1 can be inserted through the mounting member 4 via the central hole 1a, and arranged on the supporting member 5 having a ring shape. Thereby, the disk 1 is supported on the supporting member 5 by making contact in the vicinity of the central hole 1a at the downward surface of the disk 1 with the supporting member 5.

As shown in FIG. 1, a cylindrical holding member 7, which is arranged concentrically with the guide shaft 3, a plunger 8, which is inserted slidably into the upper part of the holding member 7, three balls 9, which are arranged at the bottom portion of the plunger 8, and an elastic member 10 such as a coil spring, which is arranged between the holding member 7 and the plunger 8, are provided above the mounting member 4 and the outside of the guide shaft 3.

The holding member 7 has a cylindrical shape, and is slightly longer than the guide shaft 3. At the bottom portion of the holding member 7 (one end of the holding member on which the mounting member 4 is arranged), a holding portion 7a is formed so as to extend. The holding portion 7a has a skirt shape, and the same inner and outer diameters as those of the supporting member 5. At the upper inside portion of the holding member 7, a stepped portion 7b is formed. In addition, at the middle inside portion of the holding member 7 in the height direction thereof, a protrusion 7c is formed so as to protrude toward the center of the holding member 7.

As shown in FIG. 6, the plunger 8 has a cylindrical main body 8a, a flange 8b, which has an L-shape extending outwardly, and is formed at the upper end portion of the main body 8a, and a ball supporting member 8c, which is formed at the bottom portion of the main body 8a. The plunger 8 is inserted into the holding member 7 so as to be slidable in the longitudinal direction of the guide shaft 3 by inserting the flange 8b into the stepped portion 7b of the holding member 7, and inserting slidably the main body 8a into the inside of the protrusion 7c, which is a flange extending inwardly in the holding member 7.

As shown in FIG. 6 and FIGS. 7A to 7D, three through-holes 8d are formed at the lower portion of the main body 8a of the plunger 8 at every 120° such that the through-holes 8d pass through the side wall of the main body 8a. In addition, the lower part of the plunger 8 includes supporting protrusions 8e, which slightly extend outwardly in the diameter direction of the main body 8a, and a flange 8f, which extends inwardly and constitutes the upper surface of the three through-holes 8d. Furthermore, the ball 9 is inserted into each through-hole 8d such that the ball 9 is caught by the top and bottom side by the flange 8f and supporting protrusion 8e. The ball 9 may be a metal ball, etc. The ball 9 is stored in the through-hole 8d so as to freely move in the diameter direction of the plunger 8 while being caught by the flange 8f and the supporting protrusion 8e.

In other words, the ball 9 is inserted into the through-hole 8d in the plunger 8 so as to be caught by the top and bottom sides with the flange 8f and the supporting protrusion 8e, and the plunger 8 is inserted slidably into the cylindrical holding member 7. Therefore, when the plunger 8 slides inside the holding member 7, the balls 9 also move inside the holding member 7 together with the plunger 8 (the balls move vertically in FIG. 1). Moreover, the side wall of the cylindrical main body 8a of the plunger 8 has three slits 8g at every 120° such that the position of the through-holes 8d is not matched with the position of the slits 8g. These slits 8g are formed linearly from the top side to the bottom side in the main body 8a. As explained above, since the supporting protrusions 8e are formed so as to extend outwardly at the bottom of the main body 8a, the plunger 8 can slightly deform and move in the diameter direction of the main body 8a. Thereby, when the plunger 8 including three balls 9 is inserted into the holding member 7 and jumps the protrusion 7c which is a flange extending inwardly in the holding member 7, the end of the supporting protrusions 8e, which extend outwardly, can elastically deform. Due to this, the plunger 8 can be inserted easily and reliably into the holding member 7.

After the plunger 8 is inserted into the holding member 7, the end of the supporting protrusions 8e is lower than the protrusion 7c, and the balls 9 are arranged around a small diameter portion 3a which is lower than a large diameter portion 3b in the guide shaft 3.

An elastic member 10, such as a coil spring, is provided at the upper outside portion of the main body 8a in the plunger 8 so as to wrap the main body 8a. Specifically, the elastic member 10 is arranged between the outside surface of the plunger 8 and the stepped portion 7b of the holding member 7 which is arranged outside of the plunger 8. The top end of the elastic member 10 is attached to the inside of the flange 8b and the bottom end of the elastic member 10 is attached to the bottom of the stepped portion 7b of the holding member 7. While clamping the disk 1 shown in FIG. 1, the elastic member 10 can apply an elastic repulsion force which can separate the plunger 8 and the holding member 7 up and down (in the axial direction of the guide shaft 3).

As explained above, FIG. 1 shows the disk chucking device A when holding the disk 1 in this embodiment (that is, clamping condition). When the disk chucking device A is in the condition shown in FIG. 1, since the elastic repulsion force of the elastic member 10 separates the holding member 7 and the plunger 8 in the axial direction of the guide shaft 3, the plunger 8 is positioned at the upper portion of the holding member 7. Due to this, the three balls 9 make contact with a locking surface 3c which is formed just under the larger diameter portion 3b of the guide shaft 3. At the same time, the protrusion 7c of the holding member 7 makes contact with the balls 9. Thereby, the balls 9 are held by the guide shaft 3 and the protrusion 7c of the holding member 7. Therefore, it is impossible for the plunger 8 to move more upwardly than the position shown in FIG. 1.

In this condition, the elastic repulsion force of the elastic member 10 presses the holding portion 7a of the holding member 7 toward the vicinity of the central hole 1a at the upper surface of the of the disk 1. The disk 1 is sandwiched between the holding portion 7a of the holding member 7 and the supporting member 5 which is positioned opposite the holding portion 7a. That is, the disk 1 is clamped by the supporting member 5 and the holding member 7 in the thickness direction of the disk 1.

Next, the disk chucking device A when releasing the disk 1 as shown in FIG. 2 (that is, unclamping condition) is explained.

As shown in FIG. 2, the plunger 8 is lowered in the holding member 7 to lower the balls 9 lower than the protrusion 7c. In other words, the balls 9 are moved lower than the protrusion 7c at the bottom side of the holding member 7. Each ball 9 moves to the gap between the small diameter portion 3b of the guide shaft 3 and the bottom portion in the holding member 7. There, the ball 9 can slightly move in the diameter direction of the small diameter portion 3b of the guide shaft 3. This is the condition in which the disk chucking device A releases the disk 1 (that is, the unclamping condition).

According to the disk chucking device A, as shown in FIG. 1, the mounting member 4, which is positioned horizontally, is inserted into the central hole 1a of the doughnut-shaped disk 1, and the vicinity of the central hole 1a at the lower surface of the disk 1 is positioned on the top surface of the ring-shaped supporting member 5, and thereby the disk 1 is supported horizontally. Then, the plunger 8 is positioned upwardly in the holding member 7 using the elastic repulsion force of the elastic member 10. In this condition, the balls 9 make contact with the locking surface 3c of the large diameter portion 3b of the guide shaft 3. At the same time, the protrusion 7c of the holding member makes contact with the balls 9. Thereby, the balls 9 are held between the guide shaft 3 and the protrusion 7c. That is, the balls 9 are locked. The elastic repulsion force of the elastic member 10 lowers the holding member 7 via the plunger 8. Thereby, the holding portion 7a of the holding member 7 is pressed to the vicinity of the central hole 1a at the upper surface of the disk 1. The disk 1 is sandwiched horizontally between the holding portion 7a and the supporting member 5. That is, the disk 1 is clamped horizontally (clamping condition).

While maintaining this condition, when the output shaft 2B of the motor 2 is rotated, it is possible to rotate the disk 1 while being held reliably.

When the motor 2 and the disk chucking device A are provided in a cleaning device for the disk 1, it is possible to clean the disk 1 while being rotated at high speed. When the motor 2 and the disk chucking device A are provided in a rinsing device for the disk 1, it is possible to rinse the disk while being rotated at high speed. In addition, when the motor 2 and the disk chucking device A are provided in a spin-coating device for the disk 1, it is possible to spin-coat the disk while being rotated at high speed.

Moreover, since the motor 2 is positioned horizontally and the guide shaft 3 is positioned perpendicularly to the motor 2 in FIG. 1, the disk 1 can be held horizontally. However, the present invention is not limited to FIG. 1. Of course, it is possible to position the guide shaft 3 in any directions, such as laterally, and transversely. In addition, of course, it is also possible to match the holding direction of the disk 1 to the direction of the position direction of the guide shaft 3.

The disk chucking device A does not hold the disk 1 from the inside of the central hole 1a of the disk using holding clicks, and clamps the disk 1 in the thickness direction of the disk 1 using the ring shaped supporting member 5 and the cylindrical holding portion 7a. Therefore, it is possible to clamp the disk 1 reliably without damage or scratching in the vicinity of the central hole 1a. It is also possible to clamp and subject the disk 1 to any treatments without damage even when the disk 1 is rotated at high speed.

In addition, there is no possibility of the vicinity of the central hole 1a of the disk 1 is damaged, dissimilar to the holding clicks in the conventional devices. Furthermore, there is no possibility of dusts of the material constituting the disk 1 being generated during holding. Therefore, the disk chucking device A of the present invention does not degrade the film properties due to the dusts of the material constituting the disk 1. In addition, the disk chucking device A does not cause defects of the disk 1 even when a thin film is laminated on the surface of the disk 1 or when the disk 1 is subjected to an etching treatment or a spin-coating treatment, like a magnetic disk or an optical disk.

In order to release the disk 1 from the disk chucking device A shown in FIG. 1, the plunger 8 is pushed into the holding member 7, as shown in FIG. 2. When the plunger 8 is pushed into the holding member 7, the balls 9 move from the large diameter portion 3b to the small diameter portion 3a in the guide shaft 3, together with the plunger 8. Thereby, since the holding force of the protrusion 7c holding the balls 9 is lost, the balls 9 can move slightly in the diameter direction of the small diameter portion 3a. Therefore, it is possible to separate the holding member 7 and the plunger 8 from the guide shaft 3 by pulling up both the holding member 7 and the plunger 8 as shown in FIG. 5.

Specifically, a pressing rod 12, which has a diameter equal to the outer diameter of the plunger 8, is pushed to the top surface of the plunger 8 as shown in FIG. 3. Then, the flange 7*d*, which is formed at the top surface of the holding member 7, is clamped by plural locking clicks 13, which have a hook portion 13*a* and are arranged around the pressing rod 12, as shown in FIG. 4. After that, the plunger 8 and the holding member 7 are pulled up while maintaining the positional relationship between them. Thereby, it is possible to pull the plunger 8 and the holding member 7 from the guide shaft 3 as shown in FIG. 5.

Thereby, the disk 1 can be released. As explained above, when the pressing rod 12 and the locking click 13 are provided with the disk chucking device A of the present invention, it is possible to change the clamping condition of the disk chucking device A to the unclamping condition. After that, it is possible to transport the released disk 1 to a next step using a transporting device, such as a robot hand.

The invention claimed is:

1. A disk chucking device which holds a disk having a central hole by sandwiching a vicinity of the central hole of the disk from one surface and another surface vertically in a thickness direction of the disk,
    wherein the disk chucking device includes:
    a guide shaft which is inserted into the central hole of the disk;
    a supporting member which is arranged at the base side of the guide shaft, and supports a vicinity of the central hole at the one surface of the disk;
    a cylindrical holding member which is arranged so as to approach to or separate from the supporting member in an axial direction of the guide shaft;
    a plunger which is arranged so as to move along the holding member in the axial direction of the guide shaft;
    a ball supporting member, which is formed in the plunger at the base side of the guide shaft;
    a ball which is stored in the ball supporting member and supported slidably in the axial direction of the guide shaft together with the plunger;
    an elastic member which is locked by the plunger and the holding member, and biases to separate the plunger and the holding member in the axial direction of the guide shaft, and biases to the holding member toward the vicinity of the central hole at the another surface of the disk;
    a locking portion, which prevents the movement of the plunger in the axial direction of the guide shaft by making contact with the balls, formed at the outside of the guide shaft, and
    a protrusion, which supports the balls by surrounding together with the guide shaft when the balls are contacted with the locking portion, formed at the inside of the holding member.

2. A disk chucking device according to claim 1, wherein the guide shaft has a small diameter portion and a large diameter portion, the large diameter portion is the locking portion, the ball moves along the small diameter portion in the axial direction of the guide shaft, the plunger moves along the holding member, the movement of the plunger is prevented by making the balls contact with the large diameter portion, and the elastic member presses the holding member toward the disk by its elastic force while the balls are supported by being surrounded by the guide shaft and the protrusion.

3. A disk chucking device according to claim 1, wherein the plunger is pressed toward the base portion of the guide shaft along the holding member to release the ball, which is locked between the locking portion and the protrusion, to enable the balls to move in the diameter direction of the guide shaft, and to enable the holding member and the plunger release from the guide shaft, thereby releasing disk.

4. A disk chucking device according to claim 1, wherein the disk chucking device further includes a pressing rod which presses the plunger toward the base side of the guide shaft to release the holding of the disk by the holding member, and a locking click which holds the holding member when the pressing rod releases the holding of the disk; and while releasing the disk, the plunger, the holding member, the pressing rod, and the locking click are separated from the guide shaft and the disk.

5. A disk chucking device according to claim 1, wherein the disk chucking device has plural ball supporting members formed around the guide shaft; the ball is stored in the ball supporting members to arrange plural balls around the guide shaft; and the protrusion, which is formed in the holding member, holds the plural balls between the protrusion and the guide shaft while the plural balls are contacted with the locking portion of the guide shaft.

6. A disk chucking device according to claim 1, wherein the chucking device further includes a motor; the guide shaft is provided at the end of an output shaft of the motor; the supporting member is provided at a side in which the output shaft of the motor is provided; the holding member and the plunger member are provided around the guide shaft, and the disk can be rotated by the motor while being supported by the supporting member and the holding member.

* * * * *